United States Patent
Gillie

(10) Patent No.: US 9,493,271 B2
(45) Date of Patent: Nov. 15, 2016

(54) SCOOP RETENTION DEVICE

(71) Applicant: The Mentality, LLC, Lake Stevens, WA (US)

(72) Inventor: Paul Thomas Gillie, Lake Stevens, WA (US)

( * ) Notice: Subject to any disclaimer, the term of this patent is extended or adjusted under 35 U.S.C. 154(b) by 0 days.

(21) Appl. No.: 14/638,971

(22) Filed: Mar. 4, 2015

(65) Prior Publication Data

US 2015/0251812 A1 Sep. 10, 2015

Related U.S. Application Data

(60) Provisional application No. 61/947,439, filed on Mar. 4, 2014.

(51) Int. Cl.
*B65D 25/24* (2006.01)
*B65D 25/10* (2006.01)
*F16M 13/02* (2006.01)
*H01F 7/02* (2006.01)
*B65D 83/06* (2006.01)

(52) U.S. Cl.
CPC ............ *B65D 25/10* (2013.01); *B65D 83/06* (2013.01); *F16M 13/02* (2013.01); *H01F 7/0221* (2013.01); *H01F 7/0252* (2013.01); *B65D 2313/04* (2013.01); *Y10T 29/4995* (2015.01)

(58) Field of Classification Search
CPC .............. B65D 2313/04; A47G 1/17; F16B 2001/0035; H01F 7/00; H01F 7/02; F16M 11/045; F16M 13/022

USPC ............ 206/553, 350, 818; 269/8; 248/683, 248/206.5, 309.4, 310, 110, 311.2, 467, 248/537; 15/143.1, 145; 211/70.6, 119.009, 211/DIG. 1; 220/480, 483

See application file for complete search history.

(56) References Cited

U.S. PATENT DOCUMENTS

| | | | | |
|---|---|---|---|---|
| 3,827,020 A | * | 7/1974 | Okamoto | B42F 15/066 248/309.4 |
| 6,553,626 B2 | * | 4/2003 | Coburn | F16C 11/04 16/224 |
| 6,888,940 B1 | * | 5/2005 | Deppen | B60R 11/0241 379/446 |
| 7,594,630 B2 | * | 9/2009 | Ternus | F16M 13/02 248/206.5 |
| 7,699,277 B2 | * | 4/2010 | Bagnall | A01K 63/006 119/230 |

(Continued)

*Primary Examiner* — Terrell McKinnon
*Assistant Examiner* — Michael McDuffie
(74) *Attorney, Agent, or Firm* — Shifrin Patent Law; Dan Shifrin

(57) ABSTRACT

A scoop retention device is provided, comprising: a first length of flexible tubing having openings at each of first and second ends, the first length of tubing being configured to receive and retain a handle of a scoop within the first opening; a first magnet secured within the opening at the second end of the first length of tubing and having an exposed surface associated with a first magnetic polarity; and a second magnet securable to the inside of a container having a surface associated with a second magnetic polarity opposite the first polarity and facing the inside of the container; whereby, the scoop is removably secured to the inside of the container by magnetic attraction between the first and second magnets.

14 Claims, 5 Drawing Sheets

(56) References Cited

U.S. PATENT DOCUMENTS

| | | | | |
|---|---|---|---|---|
| 7,918,620 B2* | 4/2011 | Del Ponte | ............ | A45C 11/008 132/315 |
| 8,161,909 B2* | 4/2012 | Sprung | ................ | A01K 61/003 119/264 |
| 8,297,569 B2* | 10/2012 | Kuhn | .................... | A47F 5/0815 248/206.5 |
| 8,479,685 B2* | 7/2013 | Sprung | ................ | A01K 63/006 119/51.04 |
| 2003/0070998 A1* | 4/2003 | Bulka | ...................... | A47K 1/09 211/66 |
| 2005/0156085 A1* | 7/2005 | Radovan | ................ | A46B 17/02 248/110 |
| 2005/0230586 A1* | 10/2005 | Gary | .................. | B65D 21/0224 248/311.2 |
| 2005/0252291 A1* | 11/2005 | Dalla Piazza | ......... | G01F 19/002 73/429 |
| 2010/0187387 A1* | 7/2010 | Mitchell | ............ | A47G 23/0225 248/206.5 |
| 2012/0199548 A1* | 8/2012 | Kitto | ...................... | B65D 55/16 215/316 |
| 2012/0205376 A1* | 8/2012 | Yang | .................... | B65D 51/247 220/212 |
| 2014/0144912 A1* | 5/2014 | Mazzilli | ............... | B65D 51/246 220/212 |
| 2014/0202917 A1 | 7/2014 | Erlebach et al. | | |
| 2015/0173413 A1* | 6/2015 | Wells | ...................... | A23P 1/084 426/302 |

* cited by examiner

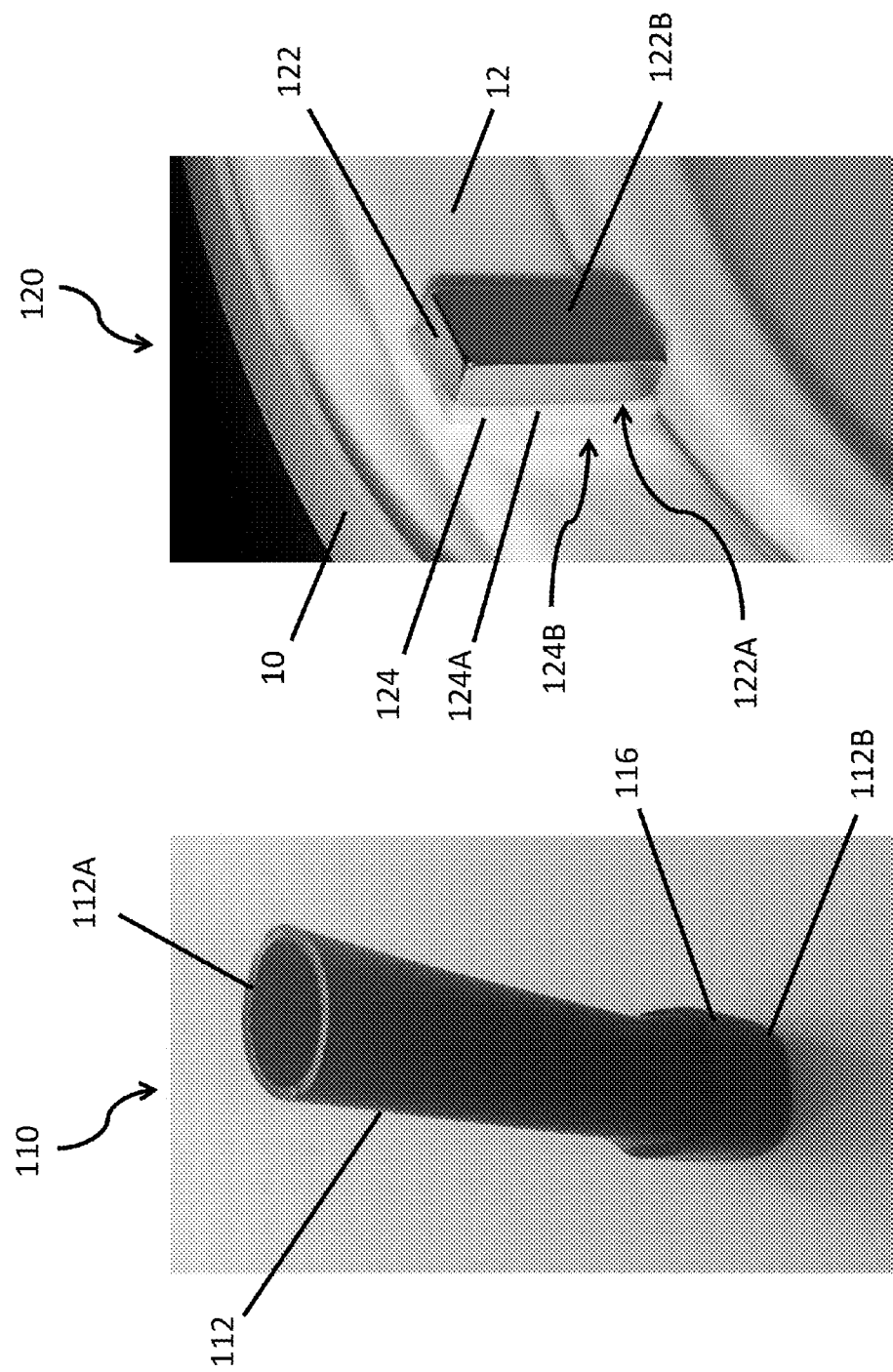

SCOOP RETENTION DEVICE

RELATED APPLICATION DATA

The present application is related to commonly-assigned and co-pending U.S. Provisional Patent Application Ser. No. 61/947,439, entitled SCOOP RETAINING DEVICE and filed on Mar. 4, 2014, which application is incorporated herein by reference in its entirety.

TECHNICAL FIELD

The present invention relates generally to keeping scoops easily available within a container.

BACKGROUND ART

Powdered, granulated or other such substances, such as protein, rice, seeds, coffee, chemical, or hair product, is often sold in containers that require some form of scoop for product retrieval. When the scoop becomes buried or lost in the granulated or powdered substance, it is not immediately available when desired or required and thus requires searching through the substance. This is very frustrating to the user, a dread of every day, maybe unforeseen until the moment of attempted retrieval. Some industries, such as hair and beauty products, require the user to mix (for example, hair color modifier) the product by inverting the closed container at least one time before product retrieval. The scoop then becomes buried and the hair stylist must now waste the customer's and his/her time to dig through the product to retrieve the scoop, and then wash and dry his/her hands. It will be appreciated that searching through the powder, protein, rice, seeds, coffee, chemical, or other substance is unsanitary and requires hand washing after the scoop is retrieved. When the substance is available for public use, such as powdered protein in a gym, hands should ideally be washed before the scoop is retrieved, as well as after, although this is rarely done.

SUMMARY OF THE INVENTION

An embodiment of the present invention provides a scoop retention device, comprising: a first length of flexible tubing having openings at each of first and second ends, the first length of tubing being configured to receive and retain a handle of a scoop within the first opening; a first magnet secured within the opening at the second end of the first length of tubing and having an exposed surface associated with a first magnetic polarity; and a second magnet securable to the inside of a container having a surface associated with a second magnetic polarity opposite the first polarity and facing the inside of the container; whereby, the scoop is removably secured to the inside of the container by magnetic attraction between the first and second magnets.

BRIEF DESCRIPTION OF THE DRAWINGS

FIG. 2A illustrates one portion of the scoop retention device of FIG. 1;

FIG. 2B illustrates the magnet of the scoop retention device of FIG. 1 secured to the inside of a container;

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

For purposes of convenience, the term "contents" is used herein generically to refer to any scoopable product or substance such as, but without limitation, the aforementioned protein, rice, seeds, coffee, chemical, or hair product.

Figure 1:
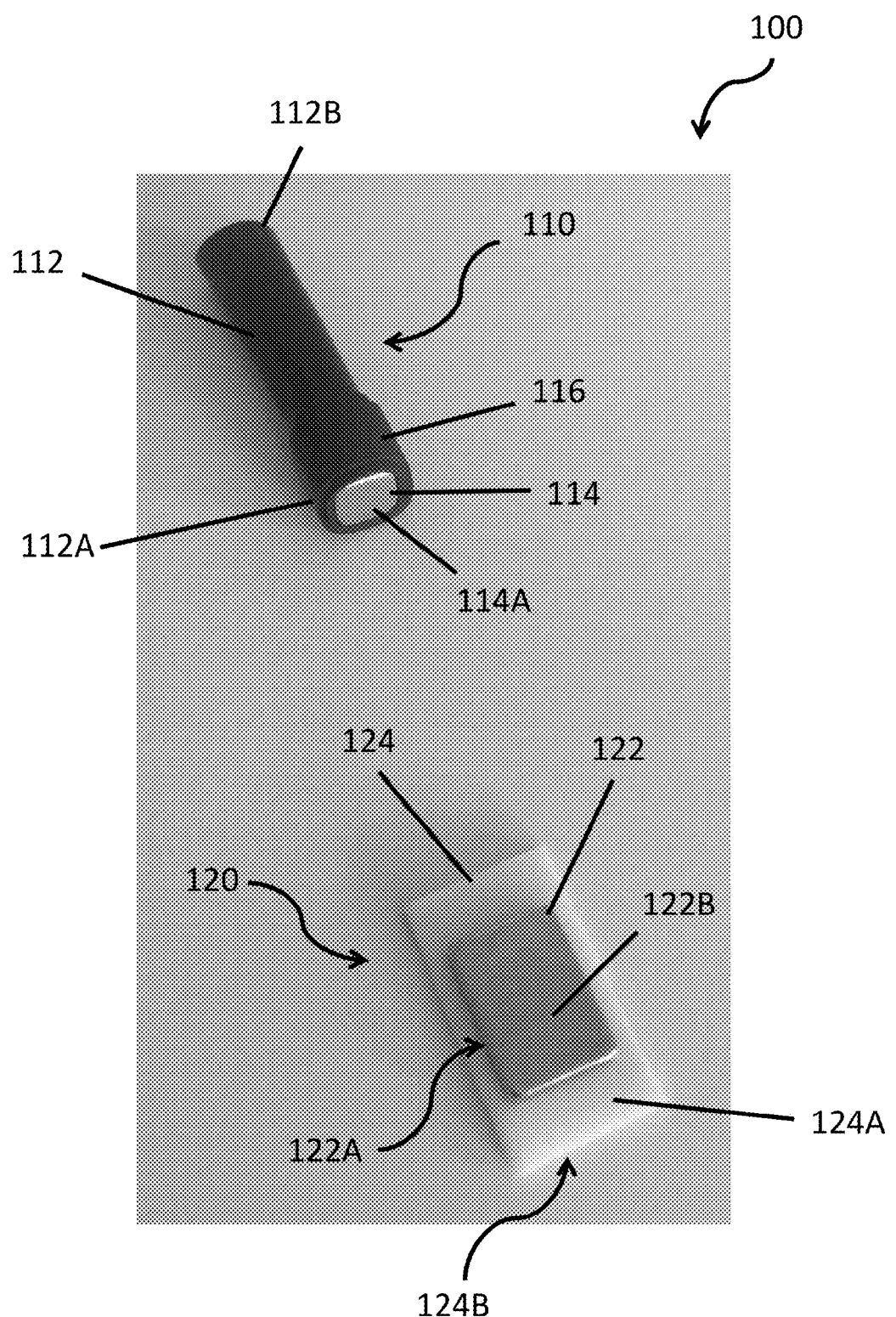
FIG. 1 illustrates an embodiment of the scoop retention device of the present invention.

FIG. 1 illustrates an embodiment of the scoop retention device 100 of the present invention. The device 100 includes a first portion 110, to which a scoop is secured, and a second portion 120, which mounts to an inside wall of a container.

The first portion 110 includes a length of flexible tubing 112, having an opening at each end 112A, 112B (see also FIG. 2A). The opening at one end 112A of the tubing 112 is stretched and a magnet 114 inserted within the opening so that it is flush with the end 112A. The end 112A of the tubing 112 is then released and allowed to close tightly around the magnet 114. In one embodiment, after the magnet 114 has been inserted into the opening, a second, shorter length of flexible tubing 116 is stretched and the end 112A is inserted into the second tubing 116. The second tubing 116 is allowed to close tightly around the end 112A and serves as a retaining ring or collar around the end 112A to prevent the magnet 114 from slipping out of the tubing 112. The exposed surface 114A of the magnet 114 is of a first magnetic polarity; i.e., either north or south be covered with a thin layer of inert material.

The second portion 120 of the scoop retention device 100 includes a second magnet 122 and a section of double-sided tape 124 (see also FIG. 2B). One side 124A of the tape 124 is secured to one surface 122A of the second magnet 122 with the opposite surface 122B having the opposite polarity as the exposed surface 114A of the magnet 114; i.e., either south or north. In the embodiment of FIG. 2, the opposite surface 122B facing the inside of the container 10 may be exposed. The other side 124B of the tape 124 is protected by a liner that may be peeled off by the consumer. The consumer may then secure the magnet 122 to an inside wall 12 of a container 10 (FIG. 2B) by pressing the magnet 122 and tape 124 to the wall 12. The magnet 122 may also be molded into plastic with the double-sided tape 124 secured to the back surface of the plastic. Preferably, the magnet 122 is mounted on an area of the inside wall 12 which has a clean, smooth surface and is close to the top of the container 10. Although the second portion 120 of the scoop retention device 100 is described and illustrated as being attached to the inside wall 12 of the container, it may instead be attached to the outside of the container 10, to the underside of the lid of the container 10, or to a wall or other surface outside the container 10.

Figure 3A:
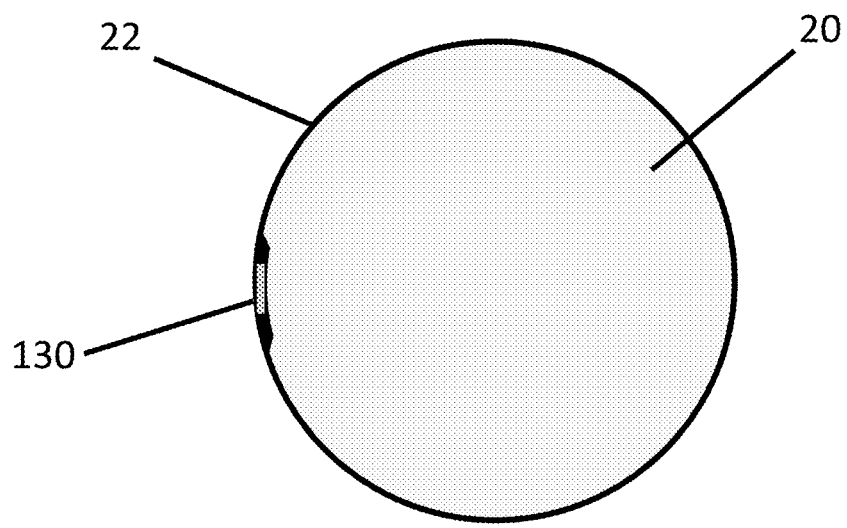
FIG. 3A is a top view of an alternative embodiment in which a magnet is embedded into the side of a container.
Figure 3B:
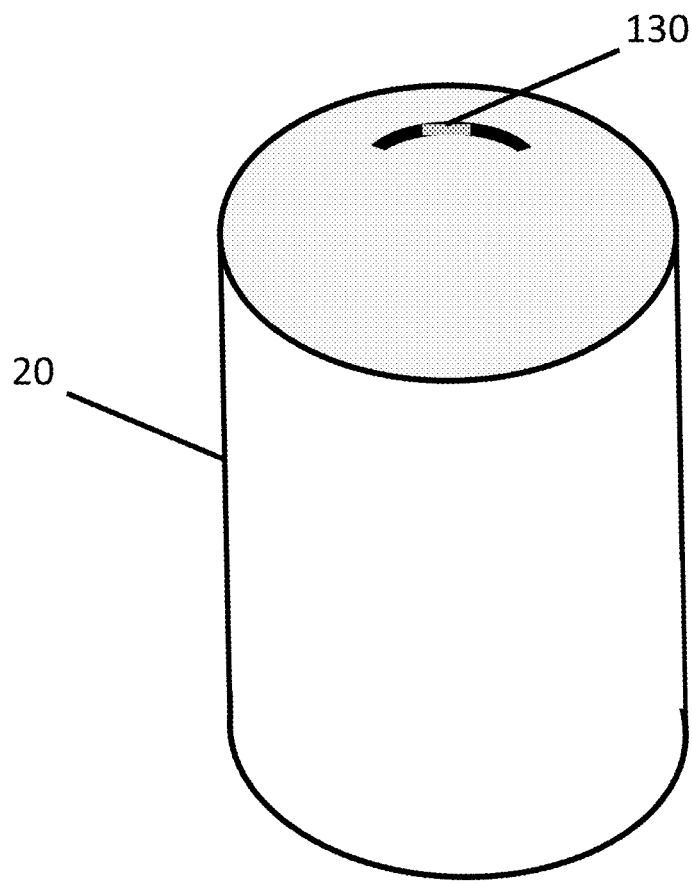
FIG. 3B is a perspective view of the alternative embodiment of FIG. 3A.

In an alternative embodiment, illustrated in FIGS. 3A and 3B, a container 20 may be manufactured with magnet 130 embedded in the wall 22, in a smooth area near the top of the container. The surface of the magnet 130 having the polarity opposite the polarity of the exposed surface 114A of the first magnet 114 faces the inside of the container 20. The container 20 may be sold without any contents, fillable by the purchaser of the container 20, such as a consumer or a company supplying the contents. The container 20 may include a scoop 30 with the first portion 110 of the retention device 100 already secured to the handle 32. To prevent the scoop 30 from moving around inside the container 20 during shipping and handling, the scoop 30 may be secured to the inside wall with a tear-off or breakable tab or other such means.

Figure 4:
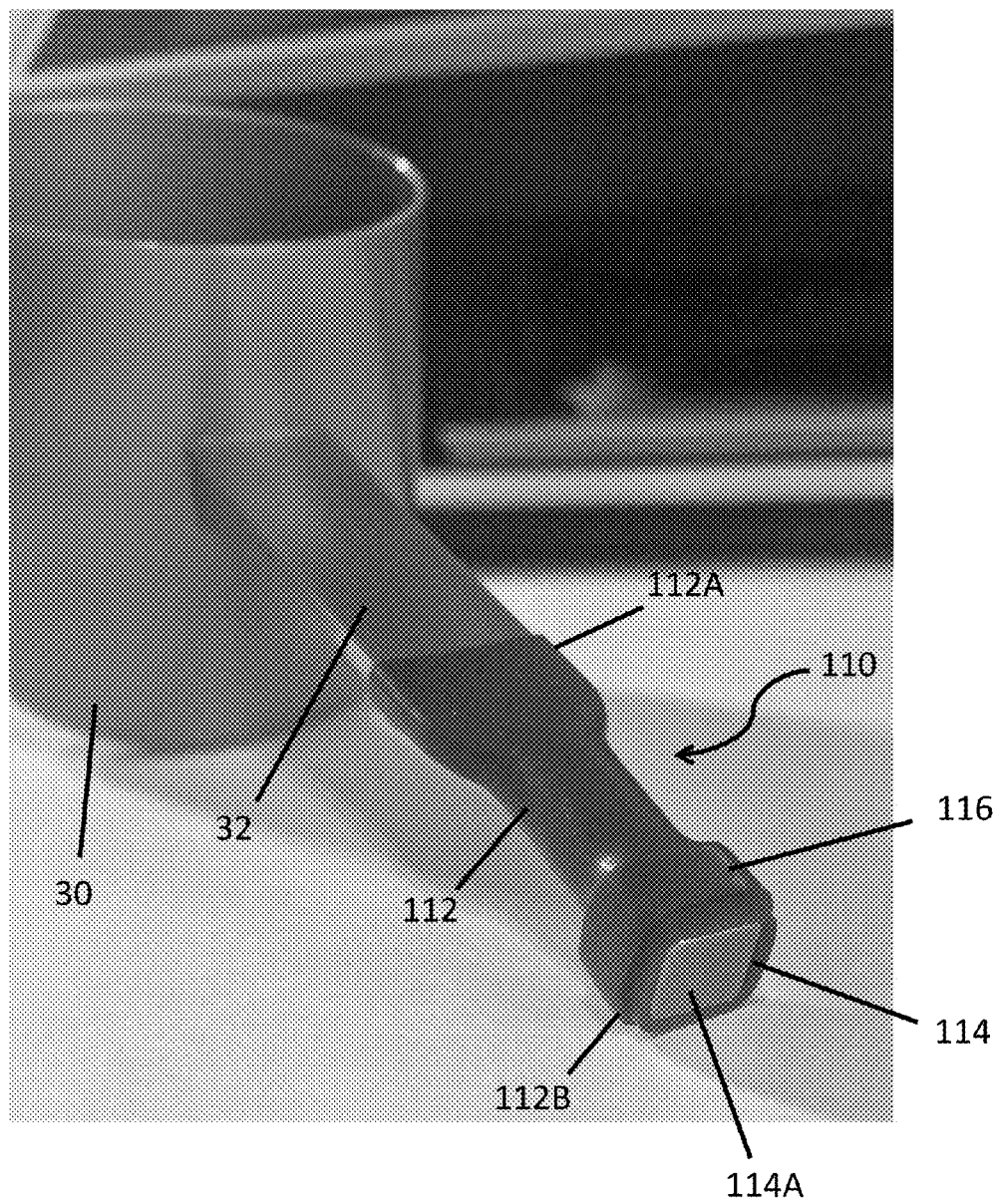
FIG. 4 illustrates the scoop retention device of FIG. 1 secured to a scoop.

To attach a scoop 30 to the retention device 100, the opening of the tube 112 at the end 112B opposite the end 112A with the magnet 114 is stretched and the end of the handle 32 of the scoop 30 is inserted. The tubing is then allowed to close tightly around the handle 32, securing it within the tubing 112, as illustrated in FIG. 4.

Figure 5:
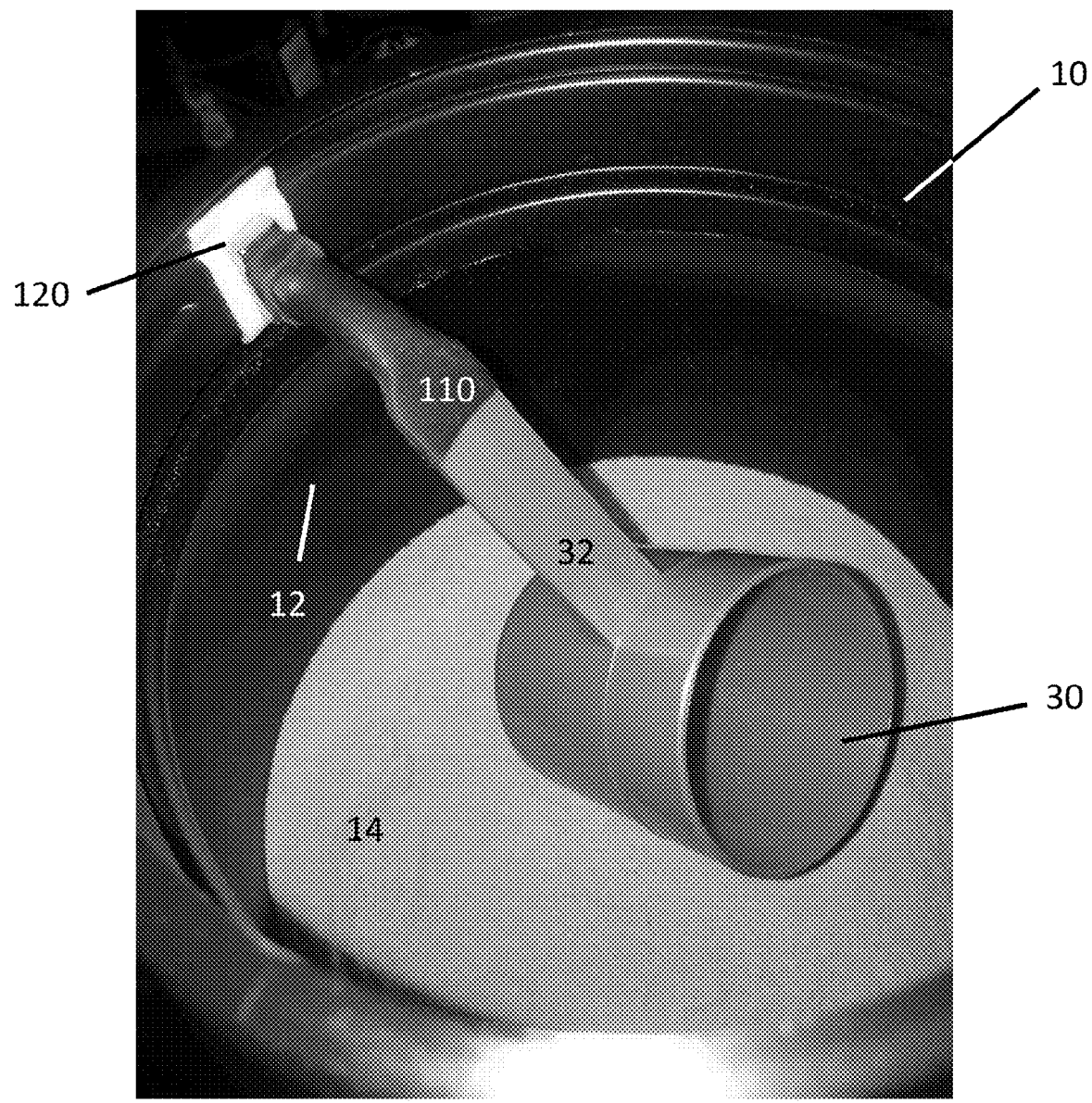
FIG. 5 illustrates a scoop with the scoop retention device of FIG. 1 removably secured to the inside of a container.

Referring to FIG. 5, to attach the scoop to the inside wall 12 of the container 10, the user moves the end 112B of the tubing 112 in which the first magnet 114 is secured close to, or against, the exposed surface 122B of the magnet 122 that is secured to the inside wall 12 of the container 10. Attraction between the opposite poles of the two magnets 114, 122 causes the first and second magnets 114, 122 to "stick" to each other, keeping the scoop 30 near the top of the container 10 and within easy reach of the user. To scoop out contents 14 of the container 10, the user may pull the scoop 30 off of the second magnet 122, scoop contents 14 from the container 10, then replace the first portion 110 of the retention device 100 onto the second magnet 122. It will be appreciated that the scoop 30 will not become buried in the contents 14 so that unsanitary digging to retrieve it is not necessary.

The dimensions of the tubing 112, the first magnet 114, the collar 116, the second magnet 122, and the double-sided tape 124 are not critical. In one embodiment, the approximate dimensions are:

Tubing 112: 1.375 inches long, 0.25 inches inner diameter (ID), 0.025 inches wall thickness.
Collar 116: 0.375 inches long, 0.125 inches ID, 0.042 inches wall thickness.
First magnet 114: 6.35 mm square, 9.5 mm thick;
Second magnet 122: 8.5 mm by 12.5 mm, 2.4 mm thick.

The double-sided tape 124 may have somewhat larger surface dimensions than the second magnet to provide a larger adhesive area against the inside wall 12 of the container 10, for example 0.875 inches long, 0.5 inches wide. Double-sided or #4932™ VHB™ tape, item #4952, has been found to provide consistently strong and long-lasting adhesive strength to secure the magnet 122 to the inside wall 12 of the container 10. Other tapes or adhesives may be used instead.

The tubing 112 and 116 may be any appropriate tubing. However, high-quality latex tubing has been found to have the stretch quality needed to stretch the openings 112A, 112B of the tubing 112 and stretch the collar 116 to insert the magnet 114 and scoop handle 32, respectively. The latex tubing has also been found to have a high enough coefficient of friction to prevent the magnet 114 and scoop handle 32 from slipping out of the tubing 112 without supplemental adhesives. Furthermore, such a material is inert and non-leaching, and thus will not contaminate the contents of the container 10.

The magnets 114, 122 may be made from any appropriate magnetic material. However, neodymium magnets of, for example, grade 42 or 48, with a nickel/copper/nickel coating has been found to have sufficient magnetic strength to hold the scoop 30 to the second magnet 122 but without requiring the user to use excessive force to remove the scoop 30 from the second magnet 122, which could cause the double-sided tape 124 to peel away from the inside wall 12 or cause the handle 32 of the scoop 30 to be pulled out from the tubing 112.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A scoop retention device, comprising:
a first length of flexible tubing having openings at each of first and second ends, the first length of tubing being configured to receive and retain a handle of a scoop within the first opening;
a first magnet secured within the opening at the second end of the first length of tubing and having an exposed surface associated with a first magnetic polarity; and
a second magnet securable to the inside of a container having a surface associated with a second magnetic polarity opposite the first polarity and facing the inside of the container;
whereby, the scoop is removably secured to the inside of the container by magnetic attraction between the first and second magnets.

2. The scoop retention device of claim 1, further comprising a second length of flexible tubing, shorter than the first length, surrounding the second end of the first length of tubing.

3. The scoop retention device of claim 2, wherein:
the first length of tubing is approximately 1.375 inches long, has an inner diameter (ID) of approximately 0.25 inches, and a wall thickness of approximately 0.025 inches; and
the second length of tubing is approximately 0.375 inches long, has an ID of approximately 0.125 inches, and a wall thickness of approximately 0.042 inches.

4. The scoop retention device of claim 2, wherein the first and second lengths of tubing are formed from an FDA-quality latex material.

5. The scoop retention device of claim 1, further comprising double-sided tape having a first surface securable to the second magnet and a second surface securable to the inside wall of the container.

6. The scoop retention device of claim 1, wherein the first and second magnets comprise neodymium magnets having a nickel/copper/nickel coating.

7. The scoop retention device of claim 1, wherein the second magnet is embedded within a wall of the container.

8. A method of retaining a scoop within a container, comprising:
providing a first length of flexible tubing having openings at each of first and second ends;
providing a first magnet;
inserting the first magnet into the opening at the first end of the first length of tubing, an exposed surface of the first magnet having a first polarity;
providing a second magnet;
securing the second magnet to the inside of a container with a surface associated with a second magnetic polarity opposite the first polarity facing the inside of the container;
inserting a scoop handle into the opening at the second end of the first length of tubing; and bringing the first end of the first length of tubing to the second magnet whereby magnetic attraction between the first and second magnets removably retains the scoop to the inside wall of the container.

9. The method of claim 8, further comprising providing a second length of flexible tubing, shorter than the first length, surrounding the second end of the first length of tubing.

10. The method of claim 9, wherein:
the first length of tubing is approximately 1.375 inches long, has an inner diameter (ID) of approximately 0.25 inches, and a wall thickness of approximately 0.025 inches; and
the second length of tubing is approximately 0.375 inches long, has an ID of approximately 0.125 inches, and a wall thickness of approximately 0.042 inches.

11. The method of claim 9, wherein the first and second lengths of tubing are formed from an FDA-quality latex material.

12. The method of claim 8, wherein securing the second magnet to the inside wall of the container comprises securing the second magnet to the inside wall of the container with double-sided tape.

13. The method of claim 8, wherein the first and second magnets comprise neodymium magnets having a nickel/copper/nickel coating.

14. The method of claim 8, further comprising embedding the second magnet within a wall of the container.

* * * * *